United States Patent
Askeland

(10) Patent No.: US 6,310,640 B1
(45) Date of Patent: Oct. 30, 2001

(54) BANDING REDUCTION IN MULTIPASS PRINTMODES

(75) Inventor: Ronald A Askeland, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/399,473

(22) Filed: Sep. 20, 1999

(51) Int. Cl.[7] .................................................. B41J 2/15
(52) U.S. Cl. ...................................... 347/41; 347/40; 347/12
(58) Field of Search .................................. 347/40, 41, 43, 347/5, 12, 15; 400/82

(56) References Cited

U.S. PATENT DOCUMENTS

| | | | | |
|---|---|---|---|---|
| 4,803,500 | * | 2/1989 | Milbrandt | 347/43 |
| 4,999,646 | * | 3/1991 | Trask | 347/41 |
| 5,384,587 | * | 1/1995 | Takagi et al. | 347/41 |
| 5,555,006 | | 9/1996 | Cleveland et al. | 347/41 |
| 5,581,284 | * | 12/1996 | Hermanson | 347/43 |
| 5,600,353 | | 2/1997 | Hickman et al. | 347/43 |
| 5,749,662 | * | 5/1998 | Shibasaki et al. | 400/82 |
| 5,805,183 | * | 9/1998 | Lidke et al. | 347/41 |
| 5,844,585 | * | 12/1998 | Kurashima et al. | 347/43 |
| 5,903,290 | | 5/1999 | Nicoloff, Jr. et al. | 347/43 |
| 5,923,349 | * | 7/1999 | Meyer | 347/43 |
| 5,929,876 | * | 7/1999 | Bartolome | 347/41 |
| 6,050,675 | | 4/2000 | Bartolome | 347/41 |

FOREIGN PATENT DOCUMENTS 00307428.3   12/2000   (EP) .

* cited by examiner

Primary Examiner—N. Le
Assistant Examiner—Lamson Nguyen
(74) Attorney, Agent, or Firm—Robert C. Sismilich

(57) ABSTRACT

A swath printer and multipass printing method for improving print quality. The printer minimizes dot placement errors on a printed medium due to depositing drops of ink from lower quality printhead nozzles by providing a printmask having a mask pattern which enables those nozzles most susceptible to dot placement error to print relatively fewer times, and which enables other nozzles less susceptible to dot placement error to print relatively more times. Such a printer and method does not require the use of fractional print modes having a corresponding reduction in throughput.

21 Claims, 13 Drawing Sheets

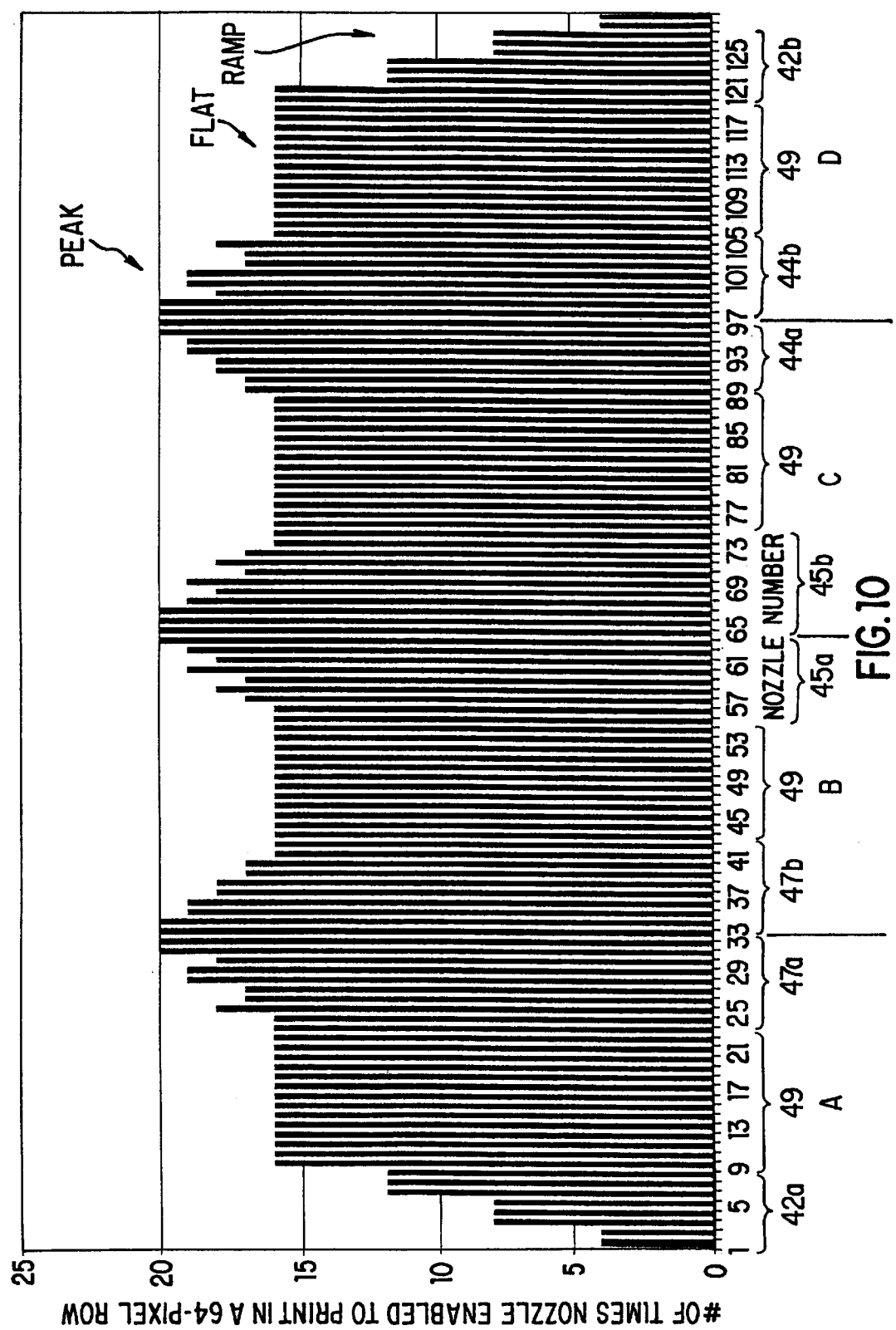

BANDING REDUCTION IN MULTIPASS PRINTMODES

CROSS-REFERENCE TO RELATED APPLICATIONS

This application relates to the subject matter disclosed in the co-pending U.S. application Ser. No. 08/682,864, by Majette et al., filed Jul. 2, 1996, titled "Minimizing Color Shift Due to Varying Deposition Order in a Printer with Bidirectionally Scanning In-Line Pens"; the co-pending U.S. application Ser. No. 09/399,534, by Bland et al., filed concurrently herewith, titled "Hybrid Printmask for Multi-drop Inkjet Printer"; and the co-pending U.S. application Ser. No. 09/399,430, by Bland et al., filed concurrently herewith, titled "Customizing Printmasks for Printhead Nozzle Aberrations"; all of which are assigned to the assignee of the present invention and hereby incorporated by reference in their entirety.

FIELD OF THE INVENTION

The present invention relates generally to modes of printing with swath-type printing systems. It relates more particularly to printmodes for improving the print quality of output produced by the printhead portion of an inkjet printer.

BACKGROUND OF THE INVENTION

Inkjet printers, and thermal inkjet printers in particular, have come into widespread use in businesses and homes because of their low cost, high print quality, and color printing capability. The operation of such printers is relatively straightforward. In this regard, drops of a colored ink are emitted onto the print media such as paper or transparency film during a printing operation, in response to commands electronically transmitted to the printhead. These drops of ink combine on the print media to form the text and images perceived by the human eye. Inkjet printers may use a number of different ink colors. One or more printheads may be contained in a print cartridge, which may either contain the supply of ink for each printhead or be connected to an ink supply located off-cartridge. An inkjet printer frequently can accommodate two to four print cartridges. The. cartridges typically are mounted side-by-side in a carriage which scans the cartridges back and forth within the printer in a forward and a rearward direction above the media during printing such that the cartridges move sequentially over given locations, called pixels, arranged in a row and column format on the media which is to be printed. Each print cartridge typically has an arrangement of printhead nozzles through which the ink is controllably ejected onto the print media, and thus a certain width of the media corresponding to the layout of the nozzles on the print cartridge, can be printed during each scan, forming a printed swath. The printer also has a print medium advance mechanism which moves the media relative to the printheads in a direction generally perpendicular to the movement of the carriage so that, by combining scans of the print cartridges back and forth across the media with the advance of the media relative to the printheads, ink can be deposited on the entire printable area of the media.

The quality of the printed output is a very important feature to purchasers of inkjet printers, and therefore manufacturers of inkjet printers pay a great deal of attention to providing a high level of print quality in their printers. Aberrations in the printhead nozzles can undesirably reduce print quality; such aberrations include, for example, not ejecting ink at all, ejecting an incorrect volume of ink in a drop, producing irregularly shaped drops with artifacts such as tails, or producing a spray of extraneous droplets in addition to the desired drop. Another common type of nozzle aberration is directionality error, also known as dot placement error, in which the drops of ink are not precisely printed in the intended locations on the print media. Different types of printheads can exhibit different types of dot placement errors; these errors are typically due to the design of the printhead and can be characterized for printheads of that particular type. In some types of printheads, it is common for the nozzles located at the top and bottom ends of the printhead to exhibit significant dot placement errors in the direction along the media advance axis, resulting in errors in the swath height, while the nozzles located in the middle of the printhead exhibit less dot placement error. Because the error-prone nozzles print the top and bottom edges of the printed swath in the wrong place, a visually significant print quality defect known as banding results. Banding results in strip-shaped nonuniformities that are visible throughout the printed image.

Banding is more objectionable in areas of the image that contain midtones, rather than highlights (light) or saturated (dark) areas. Dot placement errors are difficult to see in an area of highlights because there is typically so much white space (unprinted areas of the print medium) between the drops of ink that the placement errors are not readily perceived by the human eye. Saturated areas do not exhibit much banding because they contain very little white space, and the large volumes of ink placed in these areas hide most placement errors. But in midtone areas, which have moderate amounts of both white space and ink, small errors in dot placement can have a large effect on how much white space a person perceives.

To minimize banding due to dot placement errors (and coincidentally to also reduce the effect of printing defects resulting from having too much ink on the print medium at one time, such as bleeding of one color area into another and warping or wrinkling of the print media), most printers do not print all the required drops of all ink colors in all pixel locations in the swath in one single scan, or "pass", of the printheads across the media. Rather, multiple scans are used to deposit the full amount of ink on the media, with the media being advanced after each pass by only a portion of the height of the printed swath. In this way, areas of the media can be printed on more than one pass. In a printer which uses such a "multipass" printing mode, only a fraction of the total drops of ink needed to completely print each section of the image is laid down in each row of the printed medium by any single pass; areas left unprinted are filled in by one or more later passes. When printing of a page is complete, every area of the print medium has typically been printed on by the same multiple number of passes. Because each pass uses a different nozzle to print a particular row of the image, multipass printing can compensate for nozzle defects. To illustrate how this compensation works, consider the defect where one particular nozzle in a single-pass printmode does not work at all, causing an unprinted row (or band) of unprinted pixel locations to appear in the printed image. However, if a four-pass printmode is used instead of a single pass, the defective nozzle will only print one out of every four drops in that row, making the impact of the defective nozzle less objectionable. While the above example, for illustration, used a broken nozzle, the same principle applies to nozzles with directionality errors which print ink at incorrect locations.

However, a multipass printmode where all nozzles can deposit the same number of drops of ink is often insufficient to improve print quality to an acceptable level, particularly when specific groups of nozzles have worse errors than other groups, as in the case of swath height error as described above. Therefore, some other approaches to improving print quality have modified the printmode such that all nozzles no longer print the same number of ink drops. For instance, a printmode which prints with only the middle nozzles of a printhead which exhibits swath height error results in improved print quality. However, such an approach has the drawback of significantly increasing the amount of time it takes to print a page, because a smaller swath is printed on each pass.

Another printmode prints with all nozzles, but prints fewer drops from the end nozzles than the middle nozzles. Examples of this printmode is described in the copending and commonly-assigned European patent application Ser. No. 99301151.9, by Vinals, filed Feb. 17, 1999, titled "Printing Apparatus and Method" (Attorney Docket No. 60980088), which is hereby incorporated by reference in its entirety. In order to produce the same print density in all areas of the printed image, however, the edges of each swath must be overlapped by the edges of the next swath, thus reducing the distance the medium can be advanced between passes compared to a printmode in which all nozzles can deposit the same number of drops. As a result of the reduced medium advance distance, the amount of time required to fully print the page is increased. If this technique were applied to a four-pass printmode, for example, the majority of pixel locations on the page will be printed in four passes, but there will be strips of pixels which require five passes to print (known as a "four-five" split-pass printmode).

Just as important to an inkjet printer purchaser as print quality is the amount of time it takes to print a page, or the number of pages that can be printed per unit of time, such as pages per minute. Accordingly, there is still a need for an inkjet printer that minimizes print quality defects due to nozzle aberrations but without significantly reducing printer throughput.

SUMMARY OF THE INVENTION

In a preferred embodiment, the present invention provides a swath printing system that improves the quality of the printed output by decreasing the total number of time aberrant nozzles are used in printing on the print medium. When combined with a corresponding increase in the total number of times other higher quality nozzles are used to print the image, such a printing system provides the improved print quality without a significant reduction in printing throughput.

An embodiment of the printing system according to the present invention includes a printhead mounted in a carriage which is attached to a frame for relative motion with respect to a print medium. The printhead has an arrangement of nozzles through which ink is ejected onto a pixel grid of multiple rows on the print medium when the carriage makes a printing pass. The system also contains a print controller which activates the nozzles to deposit the ink onto the medium, as governed by a printmask. The printmask defines predetermined groups of nozzles to be activated during multiple printing passes of the printhead over the print medium. The printmask has a first mask pattern associated with an individual printing pass to decrease the total number of possible times one nozzle group can be activated for certain ones of the rows printed in the individual printing pass, in order to minimize usage of low quality nozzles. In a preferred embodiment, the printmask also has a second mask pattern associated with a different printing pass to increase the total number of possible times another nozzle group can be activated for the same certain ones of the rows printed in the different printing pass. The decreased number of possible times and the increased number of possible times are relative to printing a substantially equal number of possible times for all nozzle groups. The printing system may include a medium advance mechanism mounted on the frame for advancing the print medium relative to the printheads so as to change the row of the print medium on which a given one of the nozzles prints. As a result, the nozzle arrangement passes over a first swath of rows during a first printing pass and a second swath of at least some different rows during a second printing pass, with the second swath partially overlapping the first swath to form a subswath; each swath may includes P subswaths, and wherein exactly P printing passes are required to fully print each of the P subswaths.

More than one printhead may be included in the swath printing system. In some embodiments, all the printheads are aligned relative to each other such that each printhead deposits the ink in substantially an identical swath in a single pass. In an alternate embodiment, the printheads are offset relative to each other such that each printhead deposits the inks in substantially a different swath in a single pass. In still another embodiment, the printheads are partially aligned relative to each other such that two adjacent printheads deposit the inks in an overlapping swath in a single printing pass. Each printhead may be mounted in an individual cartridge, or multiple printheads may be mounted in a same cartridge, such as a tri-color cartridge containing three printheads. The three printheads may be aligned relative to each other such that the printheads deposit the inks in substantially an identical swath in a single printing pass, or may be offset relative to each other such that the printheads deposit the inks in different swaths in a single printing pass.

Another embodiment of the present invention uses a printmask having a mask pattern which allows some of the nozzles to deposit drops of the ink in fewer possible pixel locations of the rows in each printing pass, and allowing others of the nozzles to deposit the drops of the ink in more possible pixel locations of the corresponding ones of the rows in each printing pass. The fewer and more locations are relative to printing a substantially equal number of possible pixel locations on a row with all nozzles. Nozzles which have a tendency for higher dot placement errors between the desired target pixel locations and the actual ink deposition locations are enabled to print in fewer locations. Other nozzles which tend to produce lower dot placement errors may be enabled to print in more locations in some embodiments.

Preferably, the mask pattern has a separate pattern position for each nozzle. In some embodiments in which the nozzles are arranged in a logically linear nozzle array, the mask pattern has an upper mask subpattern governing a set of nozzles near the top end of the printhead, and a lower mask subpattern governing a set of lower nozzles near the bottom end of the printhead. The upper mask subpattern enables some of the upper nozzles nearest the top end to deposit ink in fewer pixel locations on the rows in each printing pass, while others of the upper nozzles furthest from the top end are enabled to deposit ink in more pixel locations on the rows in each printing pass. Similarly, the lower mask subpattern enables some of the lower nozzles nearest the bottom end to deposit ink in fewer pixel locations on the rows in each printing pass, while others of the lower nozzles furthest from the bottom end are enabled to deposit ink in more pixel locations on the rows in each printing pass. The mask pattern may also have at least one middle mask subpattern governing a set of middle nozzles between the top and bottom ends of the printhead. Each middle mask subpattern enables some of the middle nozzles nearest the top and bottom ends to deposit ink in more pixel locations on the rows in each printing pass. The upper and lower mask subpatterns may be graduated in order to ramp down the number of drops enabled from the nozzles towards the top and bottom ends of the nozzle arrangement, with those nozzles closest to the top and bottom ends of the linear array enabling the fewest number of drops.

Yet another swath printer according to the present invention provides a means for partially printing rows of pixel locations on a print medium with a different nozzle in a printhead during each of P printing passes, where each pixel location is enabled for printing during only one of the P printing passes. Such a print also has a means for allowing, for some rows, printing in a single printing pass of more possible pixel locations with some of the nozzles than with others of the nozzles. Printing is allowed in at least some possible pixel locations by every nozzle during each single printing pass, and exactly P printing passes are required to fully print each row.

The present invention may also be implemented as a method for printing with an inkjet printer on a print medium. The method preferably includes providing a printhead having an ink and nozzles for depositing the ink onto the print medium, moving the printhead and the print medium relative to each other to scan the nozzles along a scan axis during a printing pass, providing a printmask pattern to govern the total number of possible times nozzles can be activated during the printing pass, and decreasing the total number of possible times lower print quality nozzles can be activated during the printing pass. Preferably the method also includes increasing the total number of possible times nozzles having high print quality can be activated during the printing pass, such that more printing is performed using high quality nozzles. Depositing the ink may be performed only during scanning along the scan axis in one direction, or during scanning along the scan axis in both directions. In some embodiments, the method also includes depositing an ink pattern to partially print a swath which partially overlaps a prior swath to form a subswath, advancing the print medium relative to the printhead along a media advance axis substantially orthogonal to the scan axis, and forming a sequence of P subswaths on the print medium by repetitively depositing an ink pattern and advancing the print medium, the distances of advancing the print medium chosen such that exactly P printing passes are required to fully print each swath. The distance of advancing may be the same for every advance, or different for at least two different advances. An alternate method according to the present invention may include a printmask which enables ink to be deposited in fewer possible pixel locations in rows printed with lower quality nozzles, and in more possible pixel locations in rows printed with higher quality nozzles.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 10 is a graph for a 64-cell mask pattern according to the present invention illustrating the number of times each of the 128 nozzles is enabled to print on a row of the print medium.

DESCRIPTION OF THE PREFERRED EMBODIMENT

Figure 1:
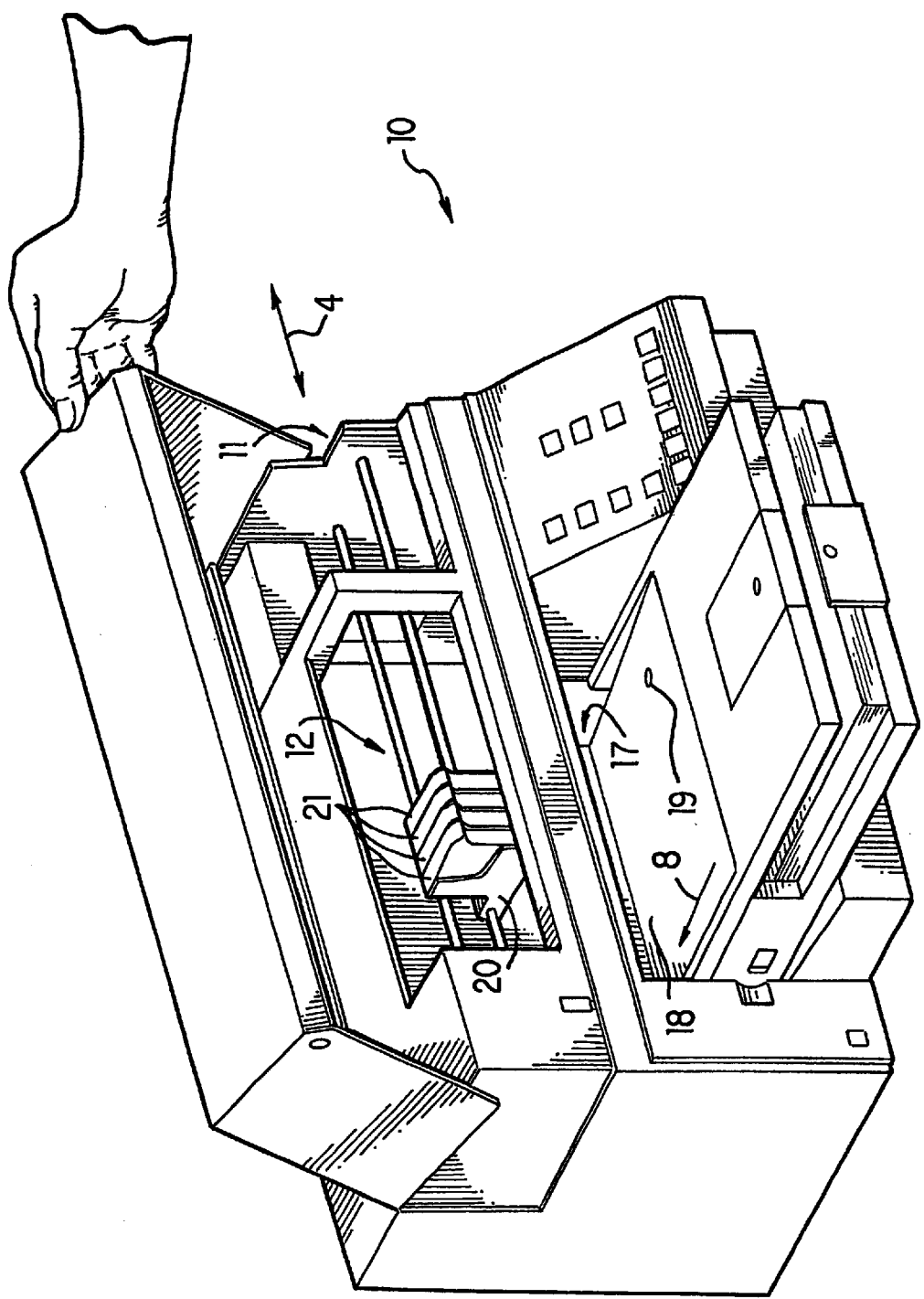
FIG. 1 is a perspective view of an inkjet printer embodying the present invention.
Figure 2:
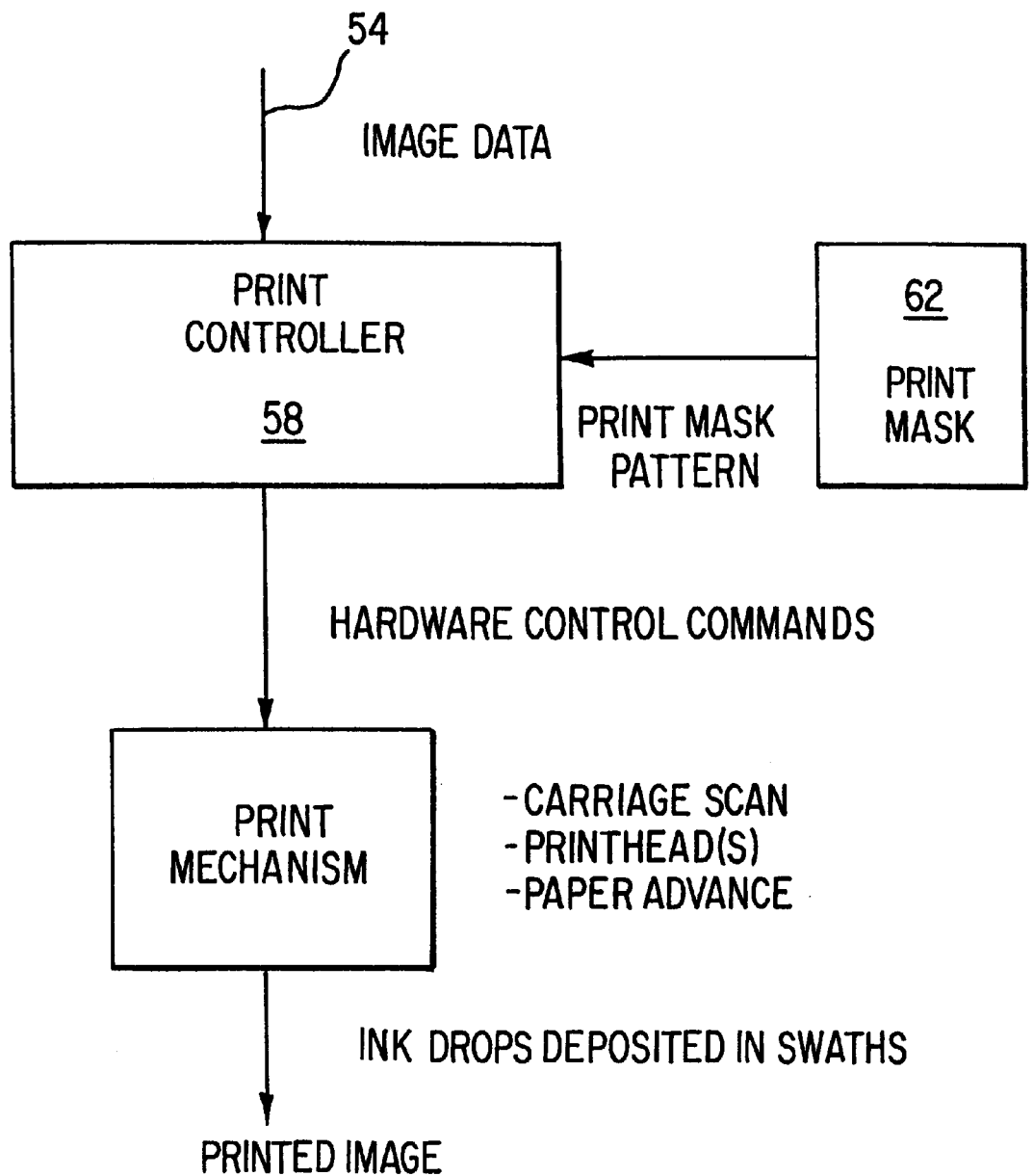
FIG. 2 is a block diagram of the major writing system sections of the inkjet printer FIG. 1.

Referring now to the drawings, and more particularly to FIGS. 1 and 2, there is illustrated a printer 10 constructed in accordance with the present invention which reduces visually objectionable banding that occurs due to nozzle aberrations, and does so without reducing printer throughput. A preferred embodiment of the printer 10 includes a frame indicated generally at 11 on which a carriage 20 is moveably mounted. The carriage 20 has stalls for holding at least one printhead 21 (FIG. 1 illustrates by way of example four printheads 21) and transporting them in a printing orientation adjacent the surface of a print medium 18 having a plurality of pixel locations, such as pixel location 19, organized in a rectangular array of rows and column. The carriage 20 is mounted in the frame 11 for relative motion with respect to the print medium 18 in a printing pass. Each printhead 21 has a plurality of nozzles 24 through which drops of ink 26a–b are ejected onto the print medium 18 to form an image, which may contain any combination of text, graphics, or photographs. As will be discussed hereinafter in further detail, the plurality of nozzles 24 is logically arranged as a linear array of nozzles substantially orthogonal to a scan axis 4. Typically each printhead contains a different color ink. The carriage 20 is moveable along the scan axis 4 by a carriage advance mechanism, indicated generally at 12, mounted within the frame 11. The printer 10 also has a print medium advance mechanism indicated generally at 17 mounted within the frame 11 which advances the print medium 18 along a medium advance axis 8 (the carriage advance mechanism 12 and the print medium advance mechanism 17 are well known to those skilled in the art, and will not be discussed further hereinafter). A print controller 58 controls the carriage 20 and media 18 movements and activates the nozzles for ink drop deposition. By combining the relative movement of the carriage 20 along the scan axis 4 with the relative movement of the print medium 18 along the medium advance axis 8, each printhead 21 can deposit one or more drops of ink 26 at each individual one of the pixel locations 19 on the print medium 18. As will be discussed subsequently in greater detail, a printmask 62 is used by the print controller 58 to govern the deposition of ink drops from the printhead 21. For each pixel position 19 in a row during an individual printing pass, the printmask 62 has a mask pattern which acts like a "gate" to enable the nozzle positioned adjacent the row to print, or disable that nozzle from printing, on that pixel location 19; of course, whether or not the pixel will actually be printed on by the nozzle depends on whether the image data 54 to be printed requires a pixel of that ink color in that pixel location. The printmask 62 is typically implemented in firmware in the printer 10, although it can be alternatively implemented in a software driver in a computing processor (not shown) external to the printer. According to the present invention, in order to improve print quality, the mask pattern is constructed such that nozzles of lower quality are used fewer times than nozzles of higher quality.

Figure 3:
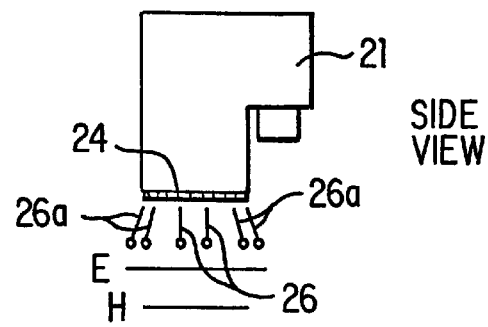
FIG. 3 is a schematic diagram illustrating the dot placement error occurring in a type of printhead usable with the printer of FIG. 1.
Figure 4A:
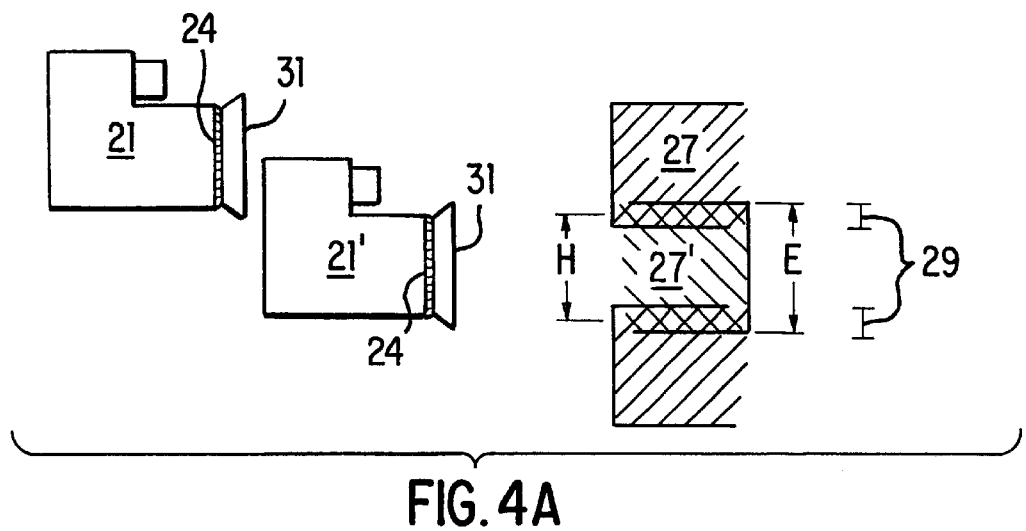
FIGS. 4A–4B are schematic diagrams illustrating the banding which can result from printing with the printhead of FIG. 3.
Figure 4B:
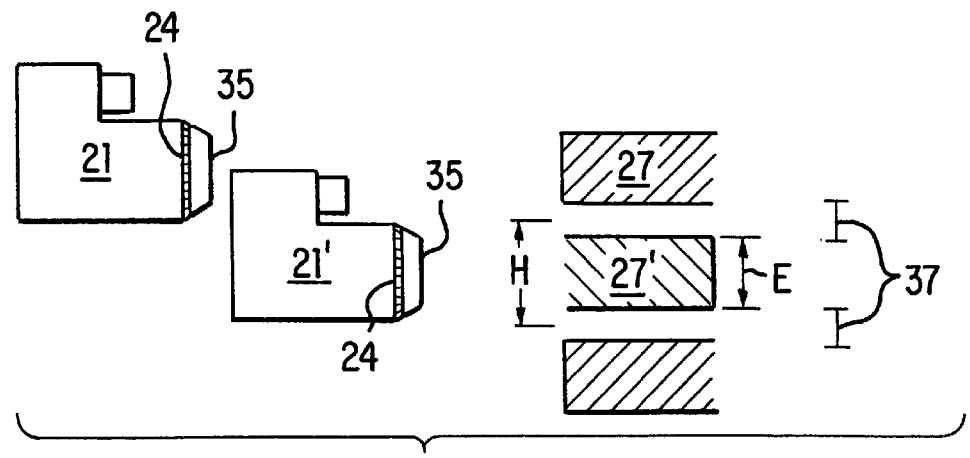

Before discussing the structure and operation of the printmask 62 in further detail, it is beneficial to consider for purposes of illustration one particular type of print quality defect that the present invention can be used to mitigate. As best understood with reference to FIG. 3, a column of nozzles 24 in the printhead 21 eject ink onto the print medium. Some of the nozzles may not deposit ink drops precisely in the intended locations, but rather place them in an actual location different from the intended location by some amount of directionality error. This directionality or dot placement error may have a component in the direction of the scan axis 4 (known as scan axis directionality, or SAD, error), and a component in the direction of the media or paper advance axis 8 (known as paper axis directionality, or PAD, error). Embodiments of the present invention can improve the print quality produced from printheads which exhibit either SAD, PAD, or both SAD and PAD. However, for purposes of illustration, the discussion herein will proceed with reference to a printhead 21 in which those nozzles adjacent the ends of the column of nozzles 24 have a greater tendency for PAD error in which the drops of ink 26a ejected from end nozzles are not precisely printed in the intended locations on the print medium, whereas drops of ink 26b ejected from middle nozzles have less of a tendency for PAD error and thus are more likely to be printed close to the intended locations. Printing with such a printhead 21 produces a printed swath of height E, rather than a swath of height H as desired, the difference between E and H defining the swath height error. As explained with reference to FIGS. 3a–3b, the direction of the dot placement PAD error can either be outward 31 from the column of nozzles, or inward 35 toward the center of the nozzle column 24. Although the present invention relates to multipass printmodes, for ease of understanding FIGS. 4a–4b illustrates a printhead operating in a single-pass printmode. In a first pass, printhead 21 prints swath 27, then advances a distance in the media advance axis 8 the full height of the printhead 21, and finally printhead 21' prints a second swath 27' in a second pass. Where the direction of the swath height error is outward 31 as in FIG. 4a, an overlapping band 29 is formed by the ink deposited from the misdirecting nozzles. Where the direction of the swath height error is inward 35 as in FIG. 4b, an unprinted band 37 remains after the ink is ejected from the misdirecting nozzles.

Figure 5:
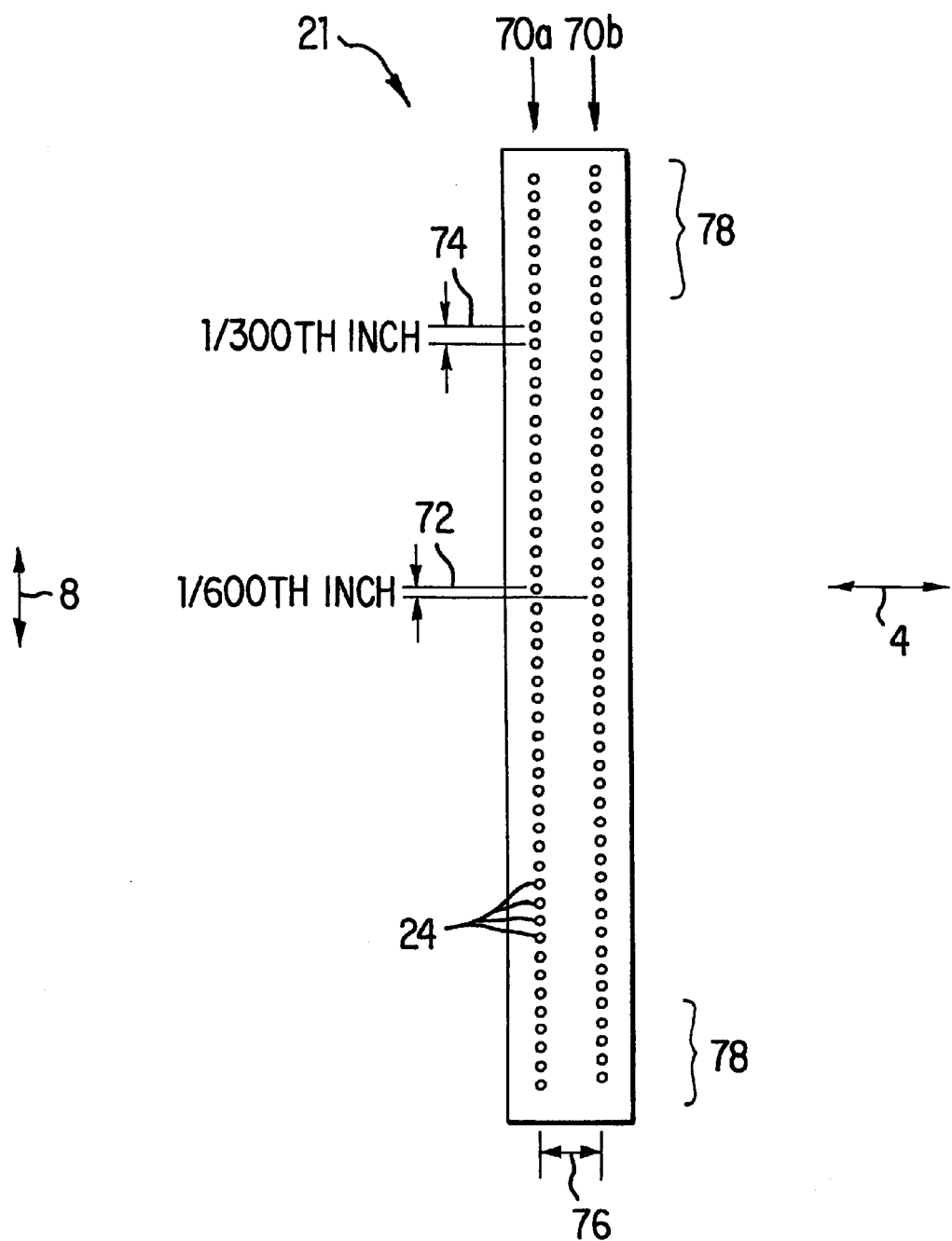
FIG. 5 is a schematic diagram of the nozzle arrangement of a printhead usable with the printer of FIG. 1.

As is well known to those skilled in the art, printheads are typically formed on silicon substrates. One or more printheads, each for a different ink, may be formed on a single substrate. Considering now the plurality of nozzles 24 in greater detail with reference to FIG. 5, a preferred embodiment of a printhead 21 has two vertical columns 70a–b of nozzles which, when the printhead 21 is installed in the printer 10, are perpendicular to the scan axis 4. The columnar vertical spacing 74 between adjacent nozzles in a column is typically 1/300th inch in present-day printheads. However, by using two columns instead of one and logically treating the nozzles as a single column, the effective vertical spacing 72 between logical nozzles is reduced to 1/600th inch, thus achieving improved printing resolution in the direction of the media advance axis 8. As an illustration, the print controller 58 would print a vertical column of 1/600th inch pixel locations on the print medium 18 by depositing ink from column 70a, then moving the printhead 21 in the scan axis direction 4 the inter-column distance 76 before depositing ink from column 70b. The misdirecting nozzles that contribute to swath height error are most frequently located in sections 78 adjacent to the top and bottom ends of the printhead 21. While not every nozzle in sections 78 will misdirect ink, these nozzles have a higher probability of doing so. Conversely, while not every nozzle outside of these sections will print in substantially the desired location, most of them will do so; they have a lower probability of exhibiting objectionable directionality errors.

Returning now to the printmask 62 bearing the previous discussions in mind, the printmask 62 defines the pattern used by the print controller 58 to partially print a swath of the image during each pass. In a given pass of the carriage 20 over the print medium 18 in a multipass printer 10, only those pixel locations 19 enabled by the printmask 62 will be printed. The printmask pattern is such that the other pixel locations in the swath are filled in during other passes. The general operation of printmasks is well known in the art, as demonstrated by the above-referenced commonly-owned U.S. Pat. No. 5,555,006 issued to Cleveland et al. Prior art printmasks generally distribute the printing in individual pixel locations on the print medium 18 equally among all nozzles and among all passes. For example, if a printhead has 100 nozzles, the printmask would enable each nozzle to print in about 1% of total pixel locations. Also, a prior art four-pass printmode having an equidistant medium advance between every printing pass will typically enable the printing of about 25% of the total pixel locations during each pass.

A printmask according to the present invention, on the other hand, has a mask pattern which decreases in a printing pass the total number of possible times the lower quality nozzles, such as nozzles adjacent the ends of the column 24, are activated to deposit ink on the medium 18. As a result, fewer possible pixel locations are enabled for printing with lower quality nozzles than would be enabled if all the nozzles were enabled to print a substantially equal number of times. In the preferred embodiment, the mask pattern also increases in a printing pass the total number of possible times certain higher quality nozzles, such as nozzles adjacent the middle of the column 24, are activated to deposit ink on the medium 18. To compensate for the reduction in possible printing locations from lower quality nozzles, more possible pixel locations are enabled for printing with higher quality nozzles than would be enabled for printing if all the nozzles were enabled to print a substantially equal number of times. As a result, the mask pattern of the present invention enables more possible pixel locations to be printed with higher quality nozzles without decreasing the print medium advance distance or resorting to a split-pass printmode, and thus without reducing throughput; the same number of printing passes are required to fully print all rows of the medium 18. For the 100-nozzle example used above, lower quality nozzles would be enabled to print in less than 1% of the total pixel locations, and higher quality nozzles would be enabled to print in more than 1% of the total pixel locations. In addition, the novel printmask for a four-pass printmode will enable printing of less than 25% of the total pixel locations in some passes, and more than 25% of the total pixel locations in other passes.

In addition to considering the mask pattern from the nozzle perspective, it can be also be considered from the perspective of a particular group of rows on the print medium 18, where a different group of nozzles prints on the group of rows during each individual printing pass of the carriage 20 along the scan axis 4. From this perspective, a different mask subpattern governs the printing on the rows for each pass. When lower quality nozzles pass over the group of rows, the mask subpattern decreases the total number of possible times those nozzles can be activated for the rows. In some embodiments, when higher quality nozzles pass over the group of rows, the mask subpattern increases the total number of possible times those nozzles can be activated for the rows.

The term "printing pass", as used herein, refers to those passes in which the printhead is enabled for printing as the nozzle arrangement moves relative to the medium 18 in the scan axis direction 4; in a bidirectional printer, each forward and rearward pass along the scan axis 4 can be a printing pass, while in a unidirectional printer printing passes can occur in only one of the directions of movement. during each printing pass. The nozzle arrangement 24 is divided into sections, the number of sections equalling the number of printing passes required to fully ink each subswath, and the height of the section corresponding to the distance in the media advance direction 8 that the medium 18 is advanced after the corresponding printing pass.

Figure 6:
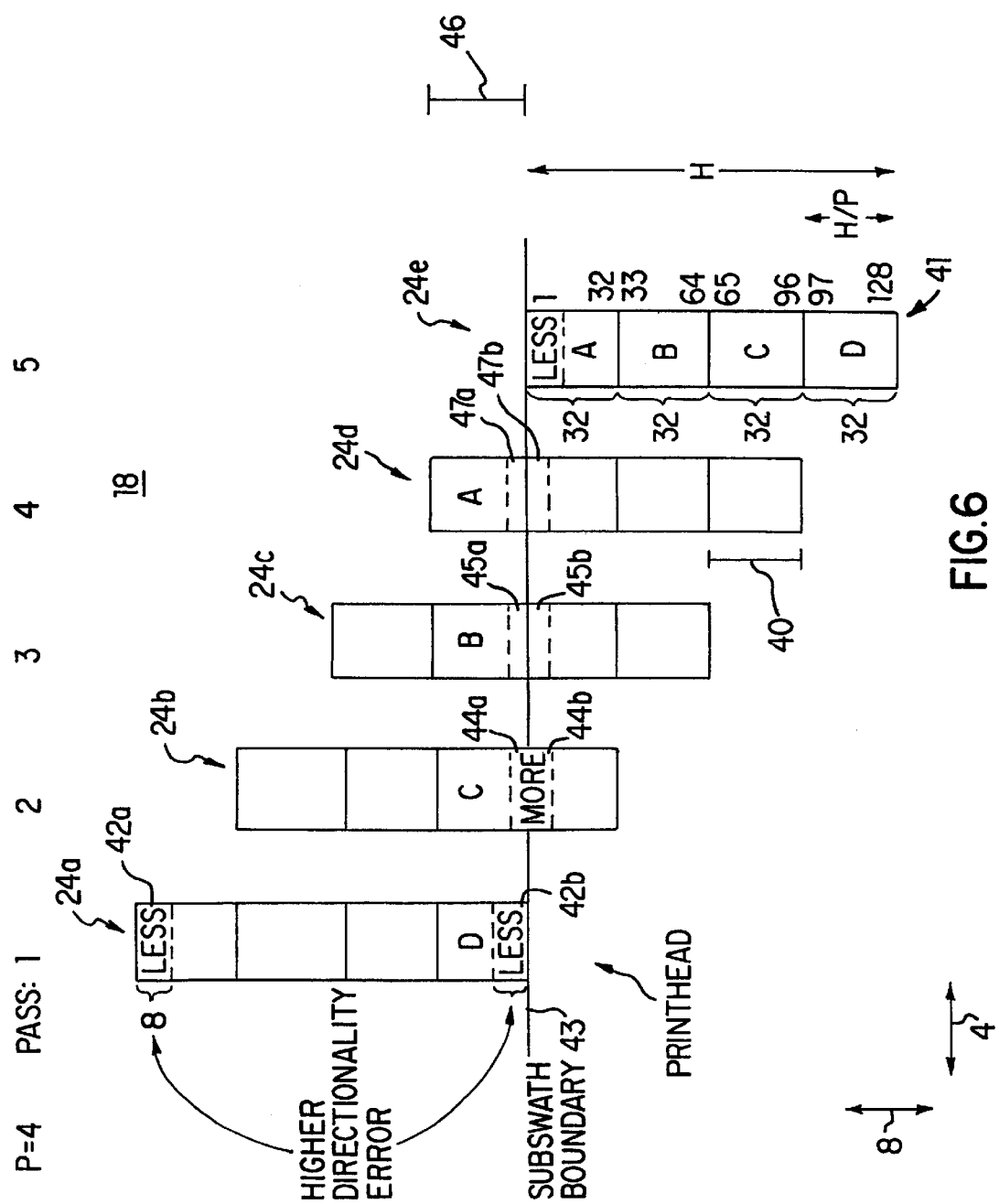
FIG. 6 is a schematic diagram illustrating different vertical positionings of the nozzle arrangement of the printhead of FIG. 5 during the printing of swaths on a print medium.

To further illustrate by way of example the structure and operation of a printmask 62 according to the present invention, FIG. 6 depicts a series of five vertical positionings 24a–e of the nozzle arrangement 24 over the print medium 18 during successive printing passes of a four-pass printmode using a printhead 21 which exhibits swath height error. The nozzle arrangement is divided into four sections, denoted A through D, and between each printing pass the medium 18 is advanced a distance in the media advance direction 8 equal to one-quarter the height H 40 of the nozzles, and each section contains one-quarter of the 128 total nozzles (thirty-two nozzles), numbered as indicated at 41. In operation, nozzle section D prints a subswath 46 located just above the subswath boundary 43 during pass 1, then the medium 18 is advanced by the height 40 of the nozzle section such that nozzle section C prints the subswath 46 during pass 2. This is repeated on passes 3 and 4 where sections B and A respectively print the subswath 46, after which time the subswath 46 of the medium 18 has been completely printed. The swath height error in this exemplary printhead 21 results from directionality errors in the top 42a and bottom 42b eight nozzles, with the error increasing the further the nozzle is located toward an end of the printhead. According to the present invention and as previously indicated, the nozzles 42a–b are used fewer possible times during the printing of the rows of the medium 18 which they pass over. Therefore, in pass 1 nozzles 42b will be enabled to print fewer than 25% of the total pixel locations in the eight rows just above the swath boundary 43. As a result, if the nozzles 44a, 45a, and 47a that pass over these eight rows are each enabled for printing only 25% of the total pixel locations, some of the pixel locations in these eight rows will not be enabled for printing, thus requiring the distance of media advance to be reduced by these eight rows, allowing them to be filled in by a fifth pass. However, one embodiment of the present invention increases the number of possible times that nozzles 44a, 45a, and 47a can be activated to compensate for the decrease in the number of possible times that nozzles 42b can be activated. In this embodiment the four passes total to 100% of the pixel locations, and thus no partial fifth pass is needed.

Considering now in greater detail the effect of the reduction and increase in printing from certain nozzles according to the present invention, and with reference to FIG. 7, there is illustrated a schematic diagram showing a detailed view of a sixteen pixel wide section of each of the sixteen rows of pixel locations immediately above and below subswath boundary 43. The contents of each pixel location, such as pixel location 19, indicates the corresponding pass in FIG. 6 in which the printhead 21 is enabled to print the pixel location. The eight rows immediately above 81a and below 81b subswath boundary 43 correspond to those rows in the illustrated segment of the medium over which the eight bottom 42b and top 42a nozzles—ie. the nozzles having dot placement error—move in printing passes 1 and 5 respectively. As a result, the number of possible times (out of sixteen) that the end nozzles are enabled to print in the illustrated row segment are reduced, as indicated at 83, to between one and three times; because the nozzle quality degrades the closer to the end a nozzle is located, the nozzles nearest the end print the fewest number of possible times. To compensate for the reduction in printing from the end nozzles, certain middle nozzles which pass over these sixteen rows 81a–81b in printing passes 2, 3, and 4 are enabled to print an increased number of times (between thirteen and fifteen); the location of these nozzles will be discussed subsequently. All rows are completely printed in four passes (passes 1 through 4 above subswath boundary 43, and passes 2 through 5 below subswath boundary 43). Conversely, the sixteen rows 82a–82b further away from subswath boundary 43 are never printed with the top 42a or bottom 42b end nozzles. Therefore, there is no need for these rows to deviate from conventional print masking techniques, and so 25% (four of sixteen) of the possible pixel locations are enabled for printing in each of the four passes.

Figures 8A, 8B:
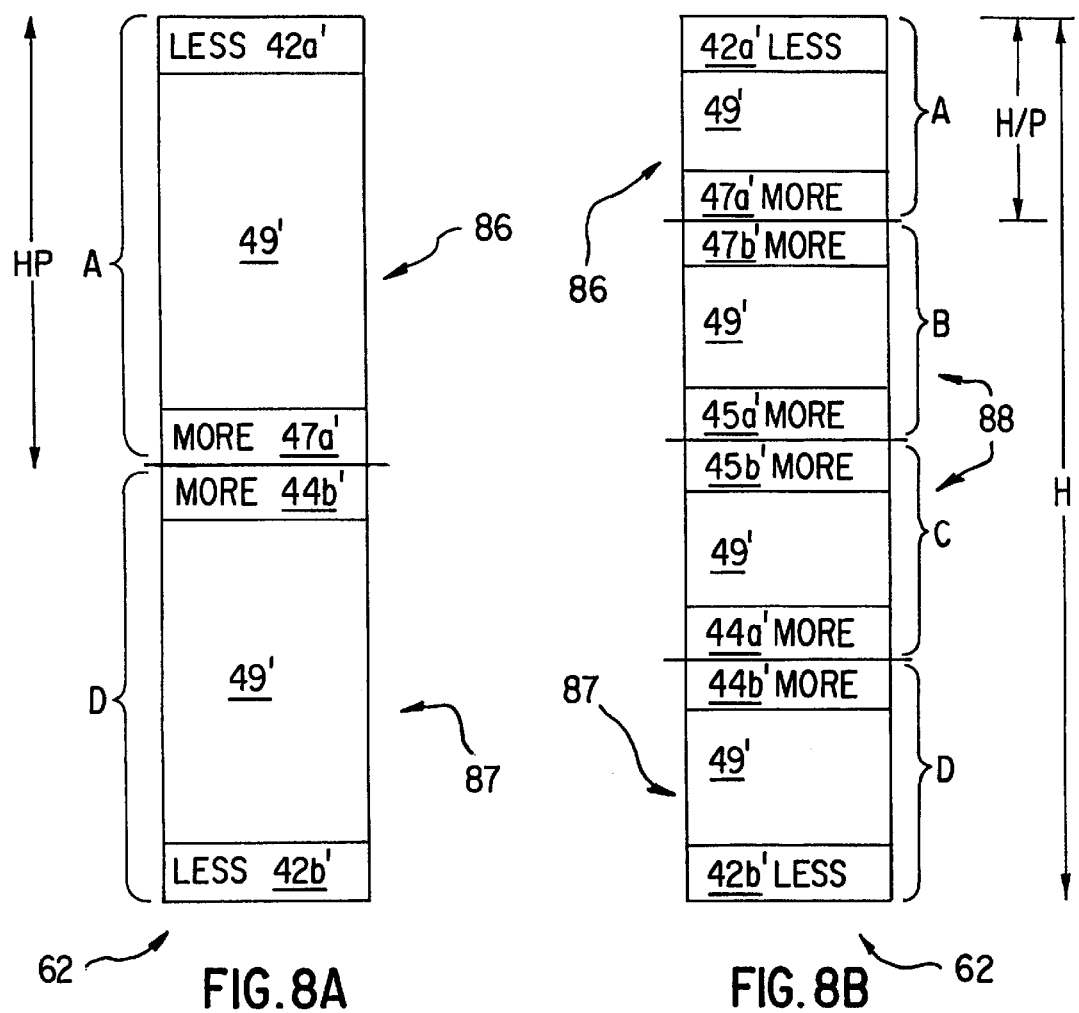
FIGS. 8A–8B are two-pass and four-pass printmasks, respectively, according to the present invention usable with the printhead of FIG. 5.

Considering now the structure of the printmask 62 in further detail with reference to FIGS. 8A–8B, there is shown a printmask 62 according to the present invention for a two-pass printmode and a four-pass printmode respectively. The mask pattern of each printmask 62 has a width of W cells which governs the printing in W corresponding pixel locations 19 in a row of the print medium 18. If there are more than W pixel locations 19 in a row, the mask pattern is repeated as needed to completely print the row. The mask pattern has a height of H cells which governs the printing for H corresponding nozzles in the printhead 21. The printhead 21 partially prints a swath of H rows in a single printing pass. In the preferred embodiment, the mask pattern height H is sized to match the total number of nozzles in the printhead 21.

In the preferred even-advance printmodes, the mask pattern is divided into P subpatterns of substantially equal height H/P, where P is the number of passes in the printmode. Exactly P printing passes are required to filly print each of the P subswaths of the swath, such as the subswath 46 as shown in FIG. 6. The height H/P of each of the P subpatterns corresponds to the height of a subswath. As best illustrated in FIGS. 8A–8B, each printmask 62 has an upper mask subpattern 86 governing the nozzles in section A adjacent the top end of the printhead 21, the upper mask subpattern 86 having a section 42a' enabling the nozzles 42a adjacent the top end to deposit the drops of the ink in fewer pixel locations of the corresponding ones of the rows in each printing pass, and a section 47a' enabling the nozzles 47a distal the top end to deposit the drops of the ink in more pixel locations of the corresponding ones of the rows in each printing pass. Each printmask 62 also has a lower mask subpattern 87 governing the nozzles in section D adjacent the bottom end of the printhead 21, the lower mask subpattern 87 having a section 42b' enabling the nozzles 42b adjacent the bottom end to deposit the drops of the ink in fewer pixel locations of the corresponding ones of the rows in each printing pass, and a section 44b' enabling the nozzles 44b distal the bottom end to deposit the drops of the ink in more pixel locations of the corresponding ones of the rows in each printing pass. For printmodes having three or more passes, each printmask 62 also has at least one middle mask subpattern 88 governing the nozzles in sections B and C located between the top and bottom ends of the printhead 21, the middle mask subpattern 88 having sections 44a', 45b', 45a', and 47b' enabling the corresponding nozzles 44a,45b, 45a,47b to deposit the drops of the ink in more pixel locations of the corresponding ones of the rows in each printing pass.

Figure 9A:
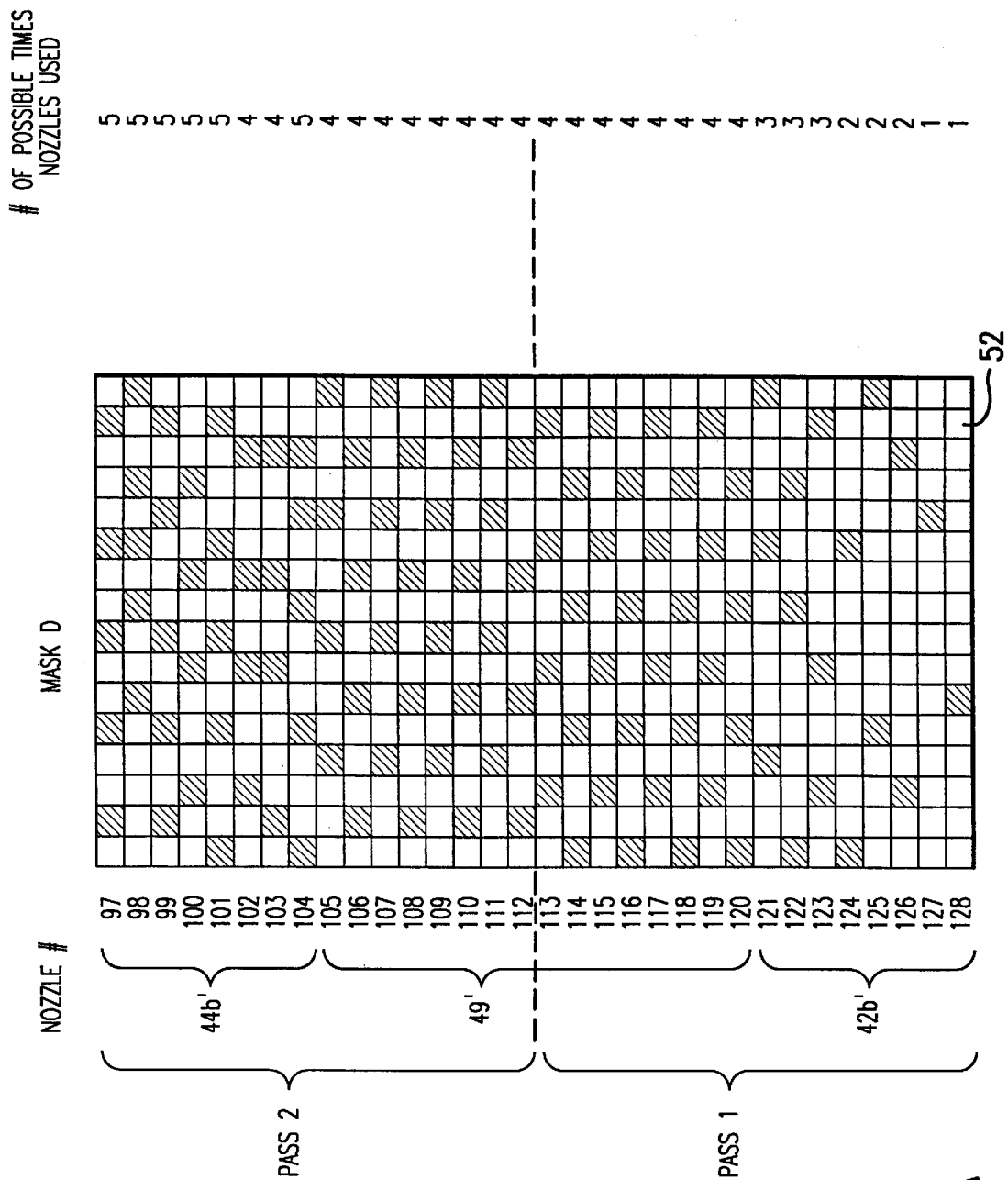
FIGS. 9A–9B are mask patterns for sections of the four-pass printmask of FIG. 8B which implement the printing pattern of FIG. 7.
Figure 9B:
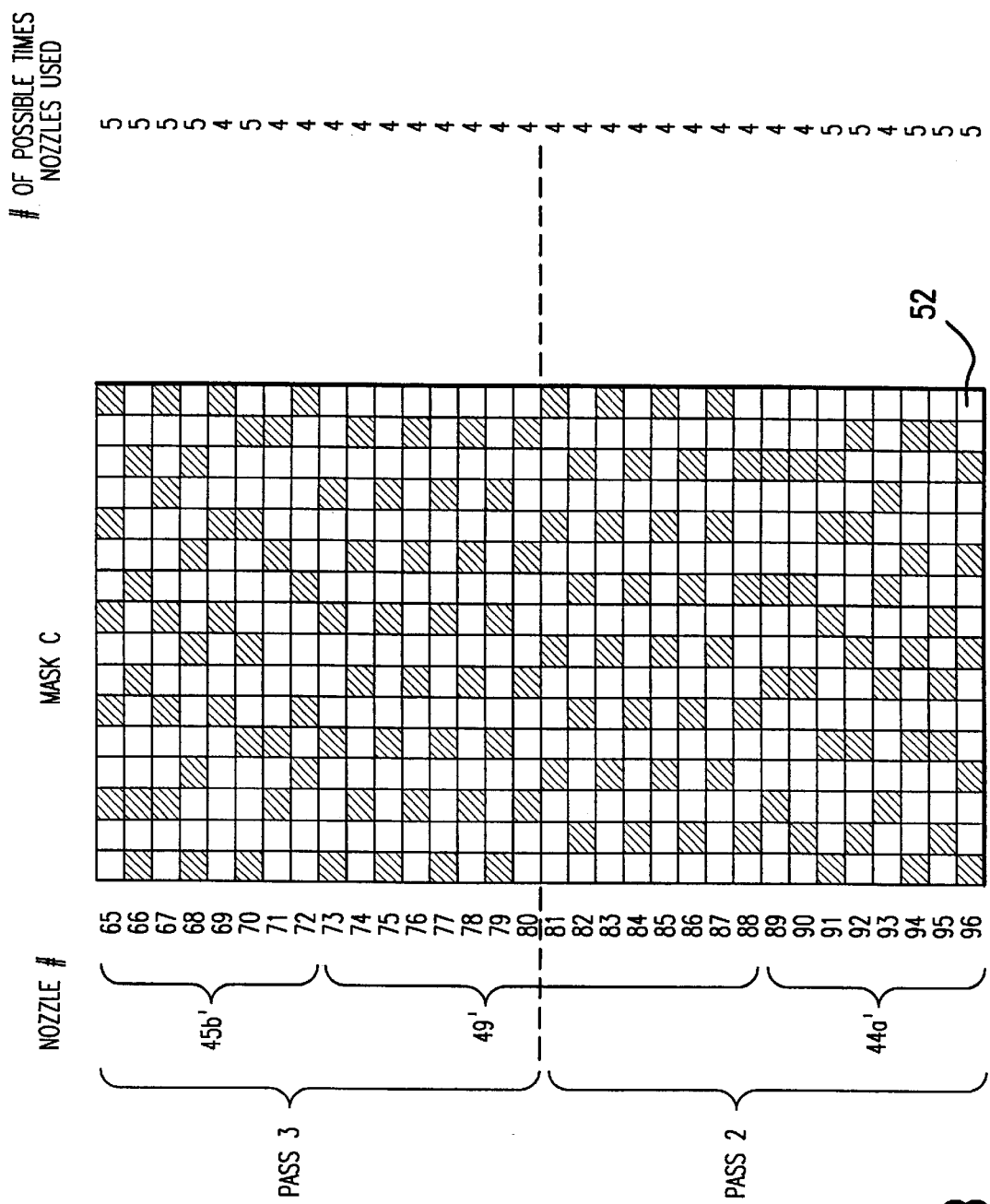

As best seen with reference to FIGS. 9A and 9B, each cell of the printmask 62, such as a cell 52, enables or disables the printing of a corresponding pixel in the row of the print medium 18 associated with the present position of the printhead 21. If the image data 54 to be printed requires the color ink contained in the printhead 21 for that pixel, ink will be deposited in that pixel during that printing pass only if the printmask cell enables it. If a particular pixel location is not enabled for printing during one pass, the mask patterns for the various subsections are constructed such that it will be enabled by another pass, so that eventually each pixel location on the medium is enabled for printing by one of the passes. Cells enabled for printing are colored black in FIGS. 9A–9B, while cells disabled for printing are colored white. FIG. 9A illustrates an exemplary 16-cell wide mask subpattern D used for end nozzle section D, while FIG. 9B illustrates a complementary 16-cell wide mask subpattern C used for middle nozzle section C. (Because mask subpattern B is analogous to subpattern C, and mask subpattern A is analogous to subpattern D, subpatterns A and B will not be discussed further herein.) Printing from nozzles governed by mask subpattern section 42b' is enabled fewer times, with the number of times being gradually reduced the closer to the bottom end of the nozzle array the particular nozzle is located. Mask subpattern section 49' enables the corresponding nozzles to print the average number of times. Printing from some of the nozzles governed by mask subpattern sections 44b', 45b', and 44a' is enabled more than the average number of times.

Figure 7:
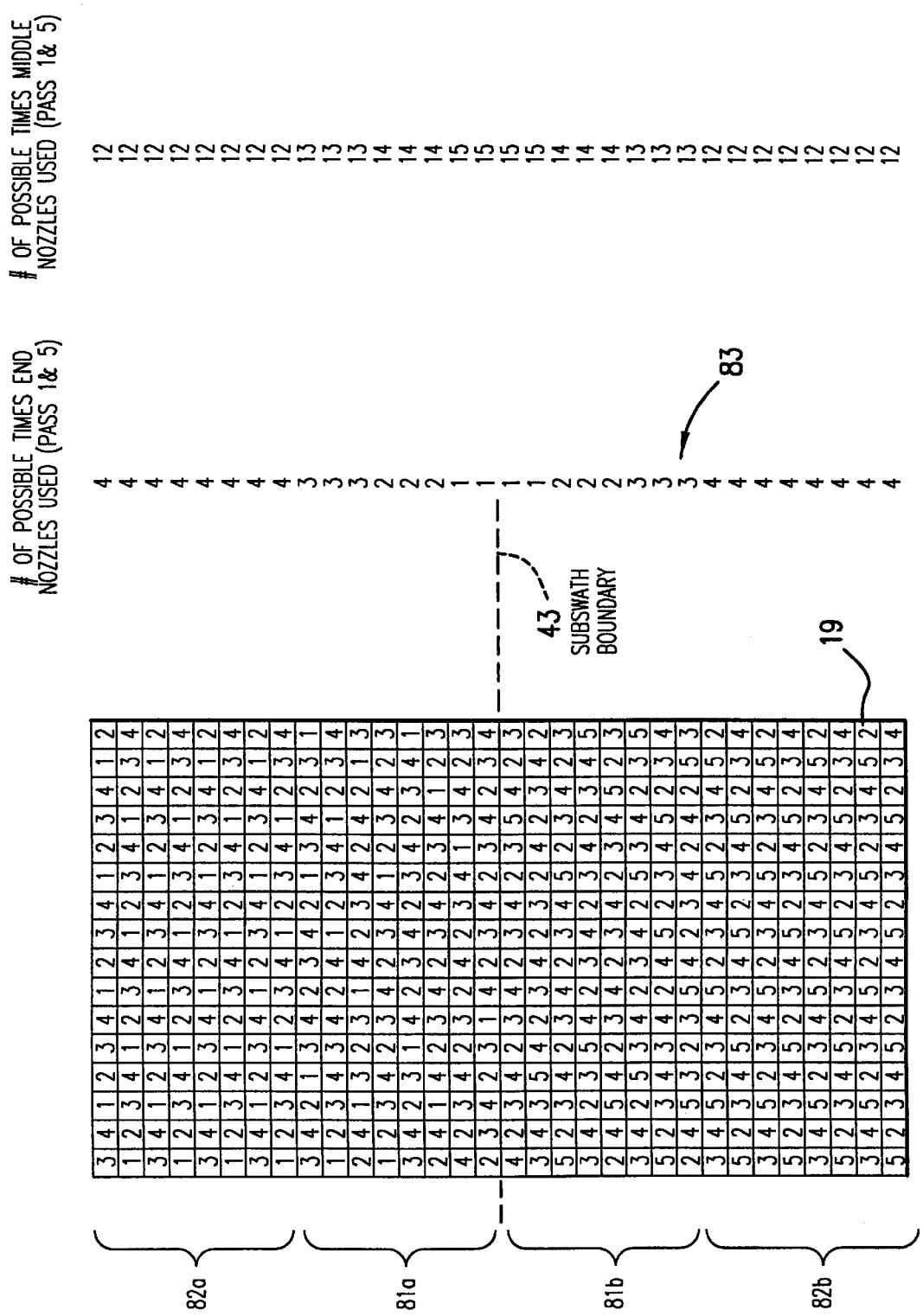
FIG. 7 is a schematic diagram illustrating which of the vertical positionings are used to print the regions above and below a swath boundary of FIG. 6 using a 16-cell printmask.

While the illustrative examples of the invention in FIGS. 7, 9A, and 9B use a 16 cell wide printmask 62, the preferred embodiment of the invention uses a printmask 62 that is 64 cells in width for a four-pass printmode. The use of a wider printmask provides more choice of values for the number of times a nozzle can be enabled to print, providing improved print quality, as illustrated in FIG. 10, which shows how many times each of the 128 nozzles, as governed by mask pattern sections A, B, C and D, is enabled to print in each set of 64 pixels in a row. In nozzle regions 44a–b, 45a–b, and 47a–b, the nozzles print more than the average number of times in order to compensate for the reduced printing from nozzles in regions 42a and 42b located at the ends of the printhead 21 which print fewer times than average. In nozzle regions 49, the nozzles are enabled to print the average number of times, which is sixteen (25% of the 64 cells). A 64 cell mask pattern is preferred over a 16 cell printmask because it allows nozzles to be enabled for printing 16, 17, 18, 19, or 20 times in each set of 64 pixels in a row; in contrast, in a 16 cell printmask the nozzles can be enabled to print only either 16 or 20 times in 64 pixels, a coarser resolution.

Figure 11A:
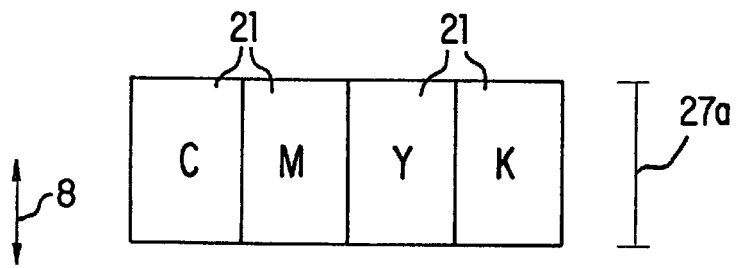
FIGS. 11A–11C are schematic views of alternative relative alignments of multiple printheads in a printer according to FIG. 1.
Figure 11B:
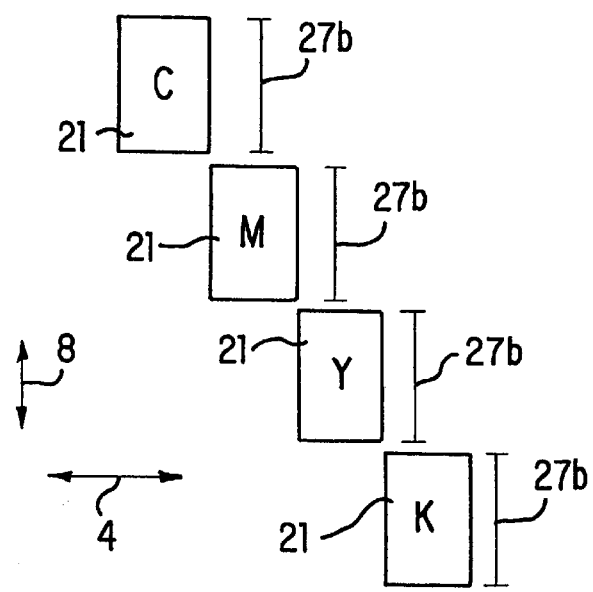
Figure 11C:
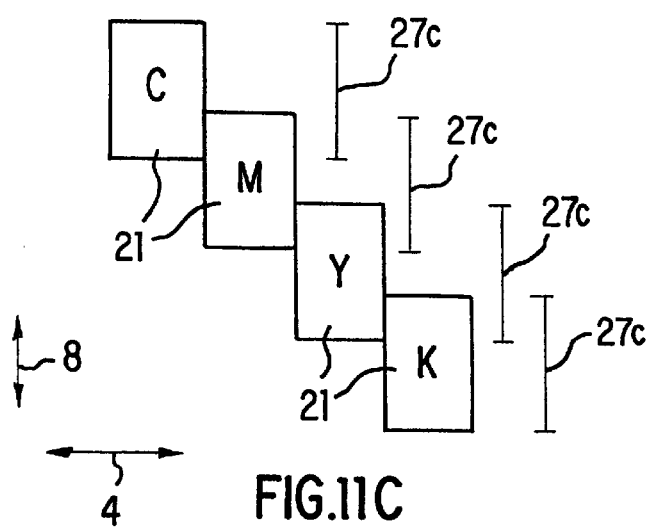
Figure 12A:
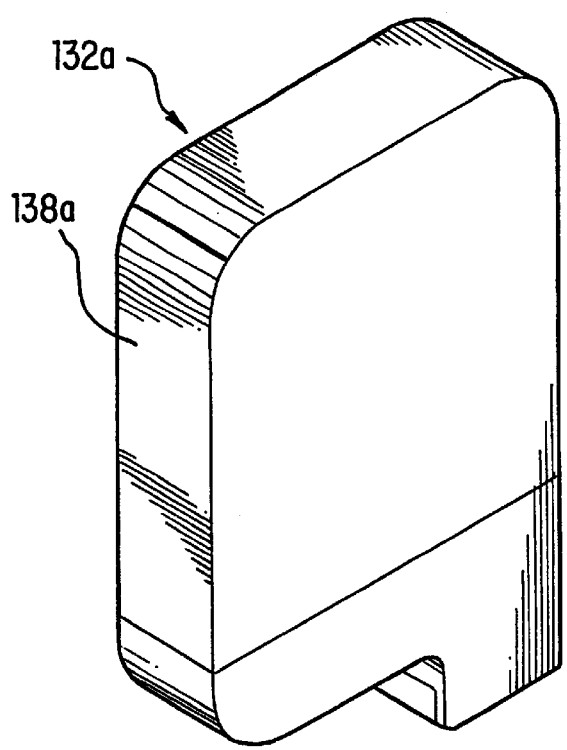
FIGS. 12A–D is a perspective view of alternative print cartridge and ink distribution systems usable with the printer of FIG. 1.
Figure 12B:
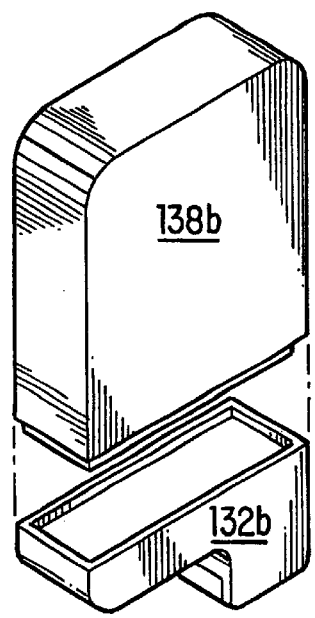
Figure 12C:
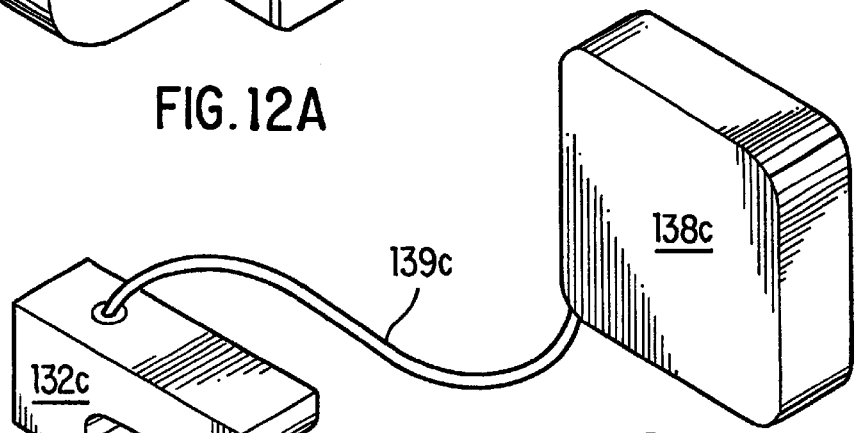
Figure 12D:
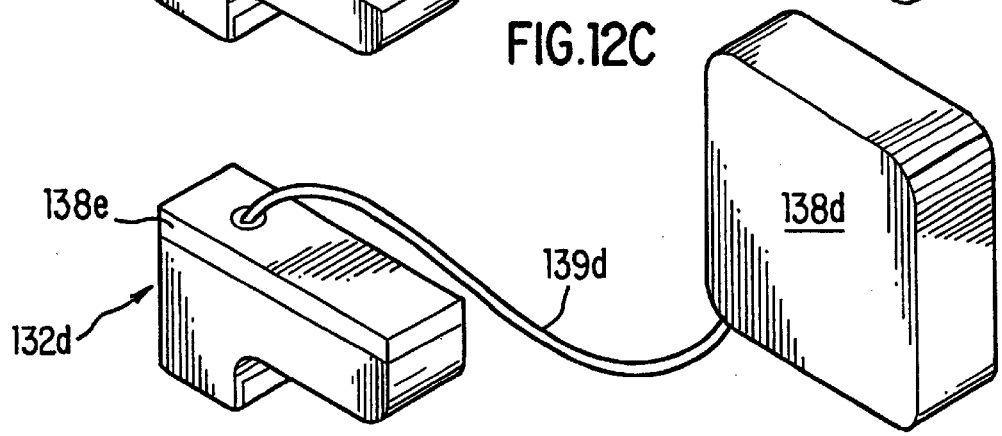

While the present invention has for purposes of illustration been described with reference to a single printhead 21, a printer 10 according to the present invention may contain additional printheads 21, as best illustrated in FIGS. 11A–11C. The printheads 21 may be oriented in the printer 10 in different positions relative to each other. In one embodiment as illustrated in FIG. 11A, four printheads 21 are aligned such that each printhead 21 deposits the ink in substantially an identical swath 27a in a single pass along the scan axis 4. In another embodiment as illustrated in FIG. 11B, the printheads 21 are offset from each other such that each printhead deposits the inks in different swaths 27b in a single pass. In a further embodiment as illustrated in FIG. 11C, all the printheads 21 are partially aligned and partially offset such that two adjacent printheads 21 deposit the inks in a partially overlapping swaths 27c in a single printing pass. In addition, alternative arrangements for mounting the printheads 21 in the carriage 20 and delivering ink to the printheads are usable with the present invention, as illustrated schematically in FIGS. 12A through 12D. Each printhead 21 is housed in a cartridge 132a–132d. A cartridge 132a–132d may contain only one printhead 21 for one ink color, or it may contain multiple printheads for multiple colors, such as a tricolor cartridge containing three printheads for cyan, magenta, and yellow respectively. The multiple printheads may be constructed on a single substrate or on different substrates. The ink may be supplied to the printhead 21 in different ways. In FIG. 12A, an ink reservoir 138a is housed within the print cartridge 132a along with the printhead. In FIG. 12B, an ink reservoir 138b is detachable from the print cartridge 132b, but the reservoir 138b is attached to the print cartridge 132b when they are installed in the carriage 20. In FIG. 12C, the print cartridge 132c does not contain an ink reservoir; ink is supplied to the cartridge 132c instead from an off-chute ink reservoir 138c via a tube 139c. In FIG. 12D, the main ink reservoir 138d is similarly located off-chute and connected to the print cartridge 132d via a tube 139d, but the print cartridge 132d also contains an auxiliary reservoir 138e. The present invention may be utilized with any of these cartridge configurations and ink delivery systems, and with other design alternatives in which the printhead 21 and the print media 18 are in relative motion to each other.

Figure 13:
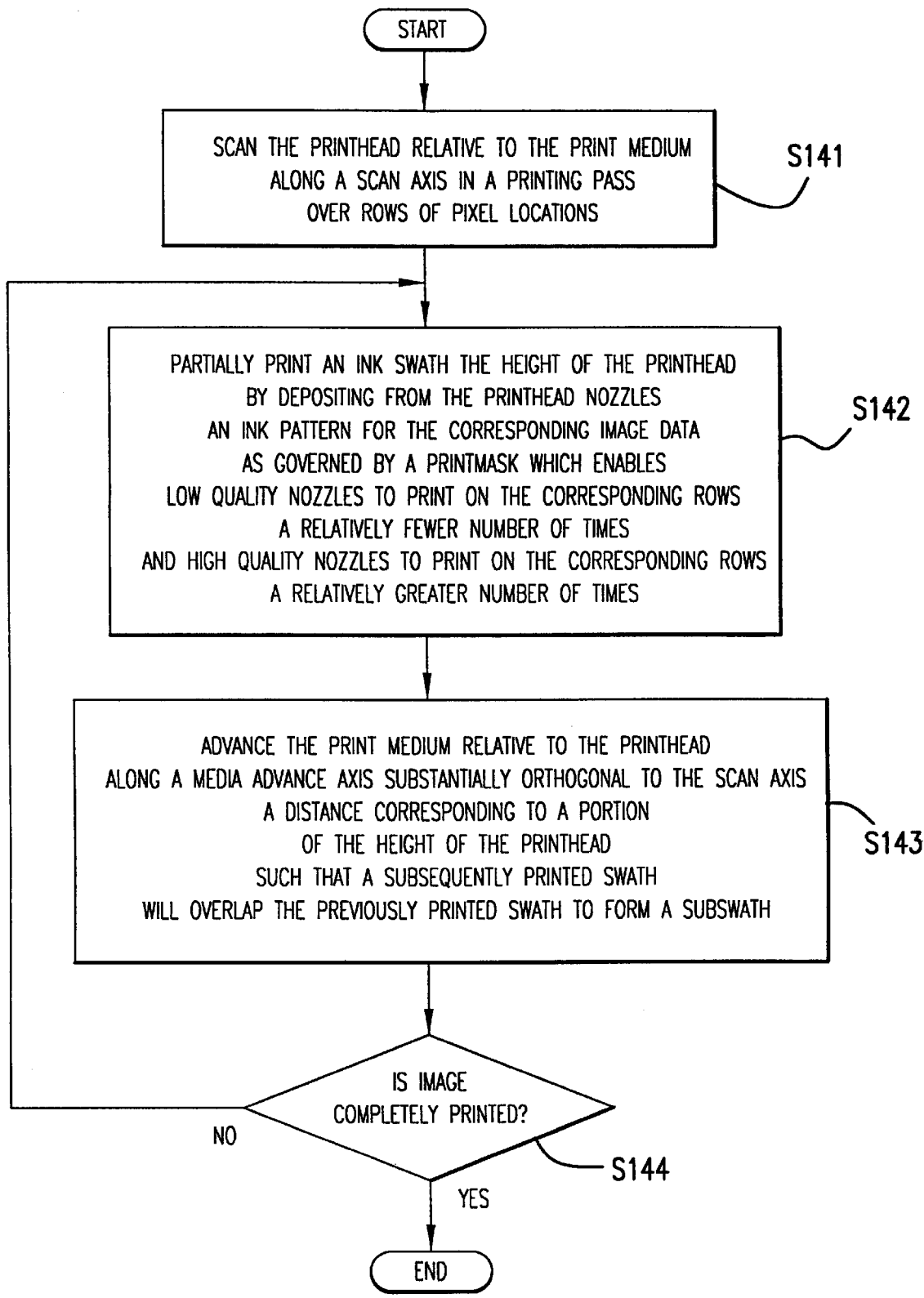
FIG. 13 is a flowchart of a printing method according to the present invention which minimizes dot placement error.

A method according to the present invention, as best understood with reference to FIG. 13, provides a printhead 21 having an ink and nozzles for depositing the ink onto the print medium 18, where each nozzle has a print quality characteristic associated with it. In step 141, the printhead 21 is scanned relative to the print medium 18 along a scan axis 4 in a printing pass over the rows of pixel locations 19, each nozzle associated with a row of the medium 18. In step 142, the printer 10 partially prints an ink swath the height H of the printhead 21 by depositing from the nozzles an ink pattern for the corresponding image data 54 as governed by a printmask 62 which enables lower quality nozzles, such as nozzles 42a–b of FIG. 6, to print on the corresponding rows a relatively fewer number of times, and high quality nozzles, such as nozzles 44a–b, 45a–b, and 47a–b, to print on the corresponding rows a relatively greater number of times. After the ink swath is partially printed, the print medium 18 is advanced relative to the printhead 21 along a media advance axis 8 substantially orthogonal to the scan axis 4 a distance corresponding to a portion of the height H of the printhead 21 such that a subsequently printed swath will overlap the previously printed swath to form a subswath, such as subswath 46. As illustrated in step 144, if the image has been completely printed, the method is complete. If some image data 54 remains to be printed, the method continues at step 142 for the image data 54 corresponding to the new location of the printhead 21 relative to the print medium 18.

From the foregoing it will be appreciated that the printer and method provided by the present invention represents a significant advance in the art. A printer can be constructed according to the present invention so as to reduce visually objectionable banding that occurs due to nozzle aberrations without reducing printer throughput. Although several specific embodiments of the invention have been described and illustrated, the invention is not to be limited to the specific methods, forms, or arrangements of parts so described and illustrated. In particular, the invention may be used with bidirectional printing where printing passes occur in both directions of movement along the scan axis 4, or unidirectional printing where printing passes occur only in one direction along the scan axis 4; with even-advance printmodes where the medium 18 is advanced the same distance between passes, with uneven-advance printmodes in which the medium 18 is advanced different distances between passes; with multipass printers requiring any number of passes to fully print a subswath; with all types of swath printers including band printers and drum printers; with all types of inkjet printers including thermal and piezo printing technologies; and with printing systems in which all the components of the printer may not be located in the same physical enclosure. Also, the invention is usable with other types of printheads having lower and higher quality nozzles regardless of where on the printhead those nozzles are located, and of how many nozzles are of lower quality. The invention is also usable with different allocations and graduations of the number of times lower and higher quality nozzles are enabled for printing. The invention is limited only by the claims.

What is claimed is:

1. A swath printing system, composing:
   a frame;
   a carriage attached to the frame for relative motion with respect to a print medium;
   a printhead mounted in the carriage, the printhead including a single-color ink and having nozzles through which the ink is ejected onto a pixel grid of multiple rows when the carriage makes a printing pass over the print medium;
   a print controller operatively connected to the printhead for controllably activating the nozzles to deposit the single-color ink onto the print medium; and
   a printmask operatively coupled to the print controller to define groups of the nozzles to be activated during multiple printing passes of the printhead over the print medium, the printmask having
     a first mask pattern associated with an individual printing pass to decrease the total number of possible times one nozzle group can be activated to deposit the single-color ink on certain ones of the rows printed in the individual printing pass, and
     a second mask pattern associated with a different printing pass to increase the total number of possible times an other nozzle group can be activated to deposit the single-color ink on the same certain ones of the rows printed in the different printing pass,
   wherein the decrease and the increase are relative to a substantially equal number of possible times for all nozzle groups.

2. The swath printing system of claim 1, wherein each of the nozzles partially prints an individual row of a swath in the printing pass, the system further comprising:
   a medium advance mechanism mounted on the frame for advancing the print medium relative to the printheads so as to change the row on which a given one of the nozzles prints.

3. The swath printing system of claim 1, wherein the nozzles pass over a first swath of rows during a first printing pass and a second swath of at least some different rows during a second printing pass, the second swath partially overlapping the first swath to form a subswath.

4. The swath printing system of claim 3, wherein each swath includes P subswaths, and wherein exactly P printing passes are required to fully print each of the P subswaths.

5. The swath printing system of claim 1, further including at least one additional printhead mounted in the carriage, all the printheads aligned relative to each other such that each printhead deposits a different single-color ink in substantially an identical swath during a single pass.

6. The swath printing system of claim 1, further including at least one additional printhead mounted in the carriage, all the printheads offset relative to each other such that each printhead deposits a different single-color ink in substantially a different swath during a single pass.

7. The swath printing system of claim 1, further including at least one additional printhead mounted in the carriage, all the printheads partially aligned relative to each other such that each of two adjacent printheads deposits a different single-color ink in an overlapping swath during a single printing pass.

8. The swath printing system of claim 1, further including a tri-color cartridge containing three additional printheads mounted in the carriage, the three additional printheads aligned relative to each other such that each of the three additional printheads deposit a different single-color ink in substantially an identical swath during a single printing pass.

9. The swath printing system of claim 1, further including a tri-color cartridge containing three additional printheads mounted in the carriage, the three additional printheads offset relative to each other such that each of the three additional printheads deposit a different single-color inks in different swaths during a single printing pass.

10. The swath printing system of claim 1, wherein the first and second mask patterns gradually change, as between adjacent nozzles, the total number of possible times an individual nozzle can be activated.

11. A multipass swath printer, comprising:
   a frame;
   a carriage attached to the frame for relative motion with respect to a print medium having a pixel grid of multiple rows, each of the rows having a plurality of pixel locations;

a printhead mounted in the carriage, the printhead having nozzles through which drops of a single-color ink are deposited onto the print medium, each nozzle capable of depositing drops of the single-color ink onto a corresponding one of the rows when the carriage makes a printing pass over the print medium;

a print controller operatively connected to the printhead for controllably activating the nozzles to deposit the drops of the ink; and a printmask operatively coupled to the print controller to govern the ejection of drops of the single-color ink during multiple printing passes of the carriage over the print medium, the printmask having a mask pattern allowing some of the nozzles to deposit the drops of the single-color ink in fewer than an average number of possible pixel locations of the corresponding ones of the rows in each printing pass, and allowing others of the nozzles to deposit the drops of the single-color ink in more than an average number of possible pixel locations of the corresponding ones of the rows in each printing pass.

12. The multipass swath printer of claim 11, wherein the nozzles partially print a swath of height H in a single printing pass, and wherein exactly P printing passes are required to fully print each of P subswaths of the swath.

13. The multipass swath printer of claim 11, wherein the nozzles are arranged on the printhead in a logically linear nozzle array, the mask pattern further comprising:

an upper mask subpattern governing a set of upper nozzles adjacent a top end of the printhead, the upper mask subpattern enabling some of the upper nozzles adjacent the top end to deposit the drops of the single-color ink in fewer than an average number of possible pixel locations of the corresponding ones of the rows in each printing pass and others of the upper nozzles distal the top end to deposit the drops of the single-color ink in more than an average number of possible pixel locations of the corresponding ones of the rows in each printing pass, and a lower mask subpattern governing a set of lower nozzles adjacent a bottom end of the printhead, the lower mask subpattern enabling some of the lower nozzles adjacent the bottom end to deposit the drops of the single-color ink in fewer than an average number of possible pixel locations of the corresponding ones of the rows in each printing pass and others of the lower nozzles distal the bottom end to deposit the drops of the single-color ink in more than an average number of possible pixel locations of the corresponding ones of the rows in each printing pass.

14. The multipass swath printer of claim 13, the mask pattern further comprising:

at least one middle mask subpattem governing a set of middle nozzles between the top and bottom ends of the printhead, the middle mask subpattem enabling some of the middle nozzles nearest the top and bottom ends to deposit the drops of the single-color ink in more than an average number of possible pixel locations of the corresponding ones of the rows in each printing pass.

15. The multipass swath printer of claim 13, wherein the mask subpatterns are graduated to gradually reduce the number of drops enabled from the nozzles in the respective top and bottom sets toward the respective top and bottom ends of the linear array, with nozzles closest to the respective top and bottom ends of the linear array enabling the fewest number of drops.

16. The multipass swath printer of claim 11, wherein the mask pattern has a separate pattern position for each of the plurality of nozzles.

17. A method for printing with an inkjet printer on a print medium, comprising:

providing a printhead having a single-color ink and nozzles for depositing the ink onto the print medium during a printing pass, each nozzle having a print quality;

providing a printmask to govern the total number of possible times nozzles can be activated during the printing pass;

decreasing relative to an average number of times for all nozzles the total number of possible times certain lower print quality nozzles can be activated during the printing pass; and increasing relative to an average number of times for all nozzles the total number of possible times certain higher print quality nozzles can be activated during the printing pass.

18. The method of claim 17, further including:

depositing an ink pattern to partially print a swath on the print medium as governed by the printmask pattern, the swath partially overlapping a prior swath to form a subswath;

advancing the print medium relative to the printhead along a media advance axis substantially orthogonal to the scan axis; and forming a sequence of P subswaths on the print medium by repetitively depositing an ink pattern and advancing the print medium, the distances of advancing the print medium chosen such that exactly P printing passes are required to fully print each swath.

19. The method of claim 18, wherein the distance of advancing is the same for every advance.

20. The method of claim 18, wherein the distance of advancing is different for at least two different advances.

21. A method for printing with an inkjet printer on a print medium having rows of possible pixel locations, comprising:

providing a printhead having a single-color ink, and nozzles for depositing the ink onto the possible pixel locations in a row, each nozzle having a print quality;

moving the printhead and the print medium relative to each other during a plurality of printing passes;

providing a printmask to govern depositing the single-color ink in each of the possible pixel locations of each row for each of the nozzles during all printing passes; and as governed by the printmask during each printing pass, depositing the ink in fewer possible pixel locations in rows printed with nozzles of lower print quality, and in more possible pixel locations in rows printed with nozzles of higher print quality, wherein the fewer possible pixel locations and the more possible pixel locations are relative to depositing the ink in an equal number of possible pixel locations with all nozzles.

* * * * *